Feb. 24, 1931. R. T. COLE 1,793,734
GARDEN STAKE AND ATTACHING MEANS THEREFOR
Filed May 24, 1930
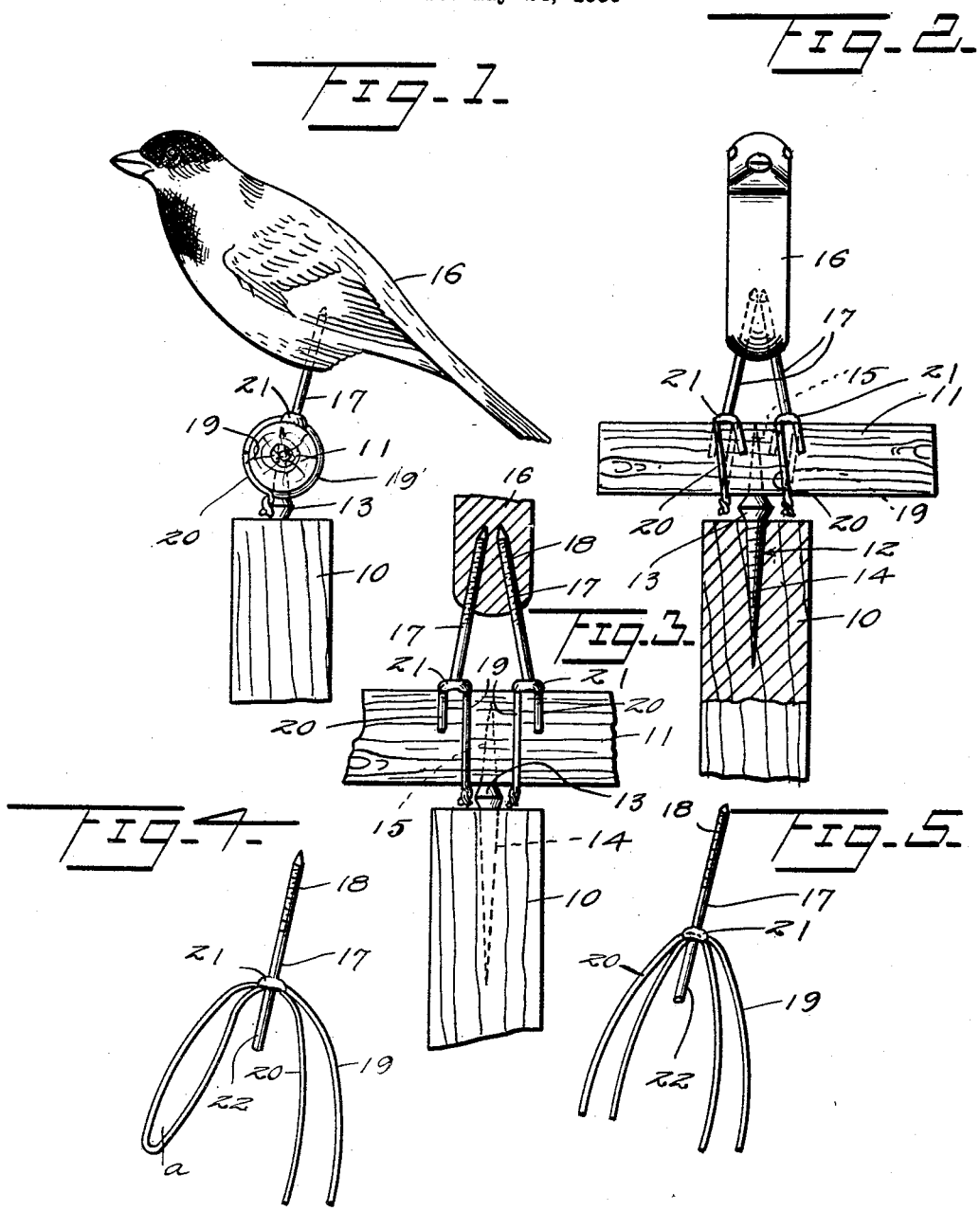
Inventor
R. T. Cole
By Frederic B. Wright
Attorney Patented Feb. 24, 1931

1,793,734

UNITED STATES PATENT OFFICE

RAYMOND T. COLE, OF WAKEFIELD, MASSACHUSETTS

GARDEN STAKE AND ATTACHING MEANS THEREFOR

Application filed May 24, 1930. Serial No. 455,348.

This invention relates to means for mounting figures of birds or other animals upon real or artificial twigs, or cross bars simulating twigs, the general object of the invention being particularly to provide a means whereby the figures of birds may be so mounted upon flower stakes that the stakes may be roughly handled without the figures becoming detached from the stakes.

A further object is to so attach the figures to the cross bar of the stake that the attaching means shall have the similitude of the bird's legs, and claws grasping the twig.

Other objects will appear in the course of the following description.

My invention is illustrated in the accompanying drawings, wherein:—

Figure 1 is a side elevation of an upper portion of a garden stake constructed in accordance with my invention;

Figure 2 is a front elevation of the structure shown in Figure 1;

Figure 3 is a fragmentary elevation showing another manner of connecting the figure to the cross bar;

Figure 4 is a perspective view of the connecting means before it is completely made;

Figure 5 is a perspective view of the connecting means completely formed but before its insertion into the figure and its connection to the cross bar.

Referring to these figures, 10 designates a stake, such as a flower stake, which is considered as of wood, and which carries a cross bar 11. This is preferably a natural twig, but might be artificial. To connect the twig or cross bar to the stake, I use a double pointed screw 12, having a head 13 and oppositely directed, threaded arms 14 and 15. The screw 14 is relatively long, the screw 15 being short and inserted into the twig 11.

The figure 16 is preferably that of a bird, cut out of wood, having a thickness of say half an inch, and this figure is decoratively or naturally colored as desired. These figures 16, of course, might be fully formed or modelled if desired but they will preferably have the form and coloring of common, well-known birds.

For the purpose of attaching the figure to the twig or cross bar, I use two shanks 17 of heavy, stiff wire, which will not bend and being screw-threaded at 18. Intermediate the ends of the shanks 17 are attached, as by soldering or otherwise, two wires 19 and 20. This may be conveniently accomplished by initially using a single length of wire as shown in Figure 4, bent to form a bight $a$, soldered to the shank at 21 and then cutting the loop $a$ at its outer end to thus form two separate wires.

That portion 22 of the shank below the point of attachment 21 is driven into the twig or cross bar 11 or forced into a hole drilled therein and then either, the ends of both wires 19 and 20 are twisted together to bind on the cross bar, as shown in Figure 3 or else the ends of one wire are twisted together and the ends of the other wire cut off and left free to simulate the claws of the bird, see Fig. 2.

As indicated in Figure 2, one end of one wire, as the wire 19, is extended diagonally to meet the opposite end of the other wire 20 and these two ends twisted together. This is particularly desirable when little twigs project out from the branch, large twig or cross bar 11. Two shanks 17 will, of course, be used with each bird figure to represent the two legs of the bird, these being disposed divergently downward. With the figure 16 so connected to the stakes, the stakes may be readily handled, forced into the ground or pulled out without chance of the figure being pulled away from the cross bar or the cross bar from the stake.

I do not wish to be limited to the use of this attaching means with garden stakes, as it might be used in connection with the mounting of birds in taxidermy. Neither do I wish to be limited to the use of bird figures, though the attaching means is particularly appropriate, as simulating the legs and claws of a bird.

I claim:—

1. A garden stake having a cross bar and a bird figure mounted on the cross bar, the figure having legs of stiff wire inserted into the figure and into the cross bar, each leg having wires attached thereto and embracing the cross bar.

2. A garden stake having a cross bar and a bird figure mounted on the cross bar, the figure having legs of stiff wire inserted into the figure and into the cross bar, each leg having wires attached thereto and embracing the cross bar, the ends of certain wires being twisted together beneath the cross bar.

3. An article of the character stated having a twig-like bar, and a bird figure having legs inserted into the figure at one end and into the bar at the other end, and wires attached to the legs and embracing the bar, the ends of the wires being twisted beneath the bar.

4. An article of the character stated having a twig-like bar and a bird figure, having legs inserted into the figure at one end and into the bar at the other end, and two wires attached to each leg, intermediate the ends of the wires, the ends of certain wires being intertwisted beneath the bar and the ends of the other wires being left untwisted to simulate claws.

5. An article of manufacture for holding figures upon a bar comprising a stiff, metallic shank and two wires each integrally formed with and united to the shank intermediate the ends of the wire and the ends of the shank.

In testimony whereof I affix my signature.

RAYMOND T. COLE.